US008514452B2

(12) United States Patent
Tsukahara (10) Patent No.: US 8,514,452 B2
(45) Date of Patent: Aug. 20, 2013

(54) IMAGE SCANNING APPARATUS AND IMAGE FORMING APPARATUS

(75) Inventor: Hajime Tsukahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 338 days.

(21) Appl. No.: 12/926,212

(22) Filed: Nov. 2, 2010

(65) Prior Publication Data
US 2011/0109945 A1    May 12, 2011

(30) Foreign Application Priority Data

Nov. 11, 2009 (JP) ................................. 2009-257940

(51) Int. Cl.
*H04N 1/40* (2006.01)

(52) U.S. Cl.
USPC .............................. 358/2.1; 358/406; 358/504

(58) Field of Classification Search
USPC .................. 358/1.9, 2.1, 461, 448, 468, 400, 358/406, 500, 504, 516–521
See application file for complete search history.

(56) References Cited

U.S. PATENT DOCUMENTS

| | | | | |
|---|---|---|---|---|
| 4,806,775 | A * | 2/1989 | Uchida | 358/494 |
| 5,864,408 | A * | 1/1999 | Kumashiro | 358/461 |
| 7,719,724 | B2 | 5/2010 | Tsukahara | |
| 7,817,317 | B2 * | 10/2010 | Ito | 358/516 |
| 2004/0207883 | A1 | 10/2004 | Han | |
| 2007/0216915 | A1 | 9/2007 | Tsukahara | |
| 2008/0024842 | A1 | 1/2008 | Tsukahara et al. | |
| 2008/0068467 | A1 | 3/2008 | Kanno et al. | |
| 2008/0106748 | A1 | 5/2008 | Tsukahara et al. | |
| 2008/0212146 | A1 | 9/2008 | Tsukahara et al. | |
| 2008/0297862 | A1 | 12/2008 | Tsukahara | |
| 2010/0142009 | A1 | 6/2010 | Tsukahara et al. | |

FOREIGN PATENT DOCUMENTS

| | | |
|---|---|---|
| EP | 1 187 458 | 3/2002 |
| EP | 1 467 553 | 10/2004 |
| EP | 1 806 913 | 7/2007 |
| JP | 2002-10040 | 1/2002 |
| JP | 2002-290686 | 10/2002 |
| JP | 2006-174038 | 6/2006 |

OTHER PUBLICATIONS

European Search Report dated Jun. 15, 2011 issued in corresponding European Application No. 10190413.4.

* cited by examiner

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

An image scanning apparatus includes an image scanning unit that reads an image from an original sheet by scanning an image-formed surface of the original sheet with light in a main-scanning direction and converting light reflected from the image-formed surface into electricity using a photoelectric conversion element; a shading correction unit that performs shading correction on an image signal created by reading the image from the original sheet; a white member that faces a scanning surface of the image scanning unit; and a reference-white-data creating unit that creates reference white data for the shading correction by scanning a surface of the white member using the image scanning unit; and an interval controlling unit that decreases an interval between a scanning surface of the image scanning unit and a surface of the white member when the reference-white-data creating unit creates the referential white data.

16 Claims, 8 Drawing Sheets

NO PARALLEL OPERATION

FIG. 7B

PARALLEL OPERATION

IMAGE SCANNING APPARATUS AND IMAGE FORMING APPARATUS

CROSS-REFERENCE TO RELATED APPLICATIONS

The present application claims priority to and incorporates by reference the entire contents of Japanese Patent Application No. 2009-257940 filed in Japan on Nov. 11, 2009.

BACKGROUND OF THE INVENTION

1. Field of the Invention

The present invention relates to an image scanning apparatus (an image scanning unit included in an image forming apparatus, such as a digital copying machine and a facsimile machine, or a stand-alone image scanning apparatus) such as an image scanner that reads an image from an original and an image forming apparatus that includes such as an image scanning apparatus.

2. Description of the Related Art

The above-described image scanning apparatuses include an image scanning unit and an A/D convertor (A/D converting unit). The image scanning unit reads an image from an original by scanning an image-formed surface of the original in the main-scanning direction with light that has been emitted from an illumination unit or a light source and converting, by using a photoelectric conversion element, the light reflected from the image-formed surface into electricity line by line, thereby creating an analog image signal. The A/D converter converts the analog image signal that has been created by the image scanning unit into a digital image signal and outputs the digital image signal.

A widely-known image scanning apparatus that operates in the above manner includes an image scanning unit that uses a contact image sensor (CIS) as the photoelectric conversion element for scanning. The CIS is, for example, includes a plurality of sensor IC chips (hereinafter, also referred to as "sensor ICs", simply) arranged side by side and an equal magnification optical system.

A known image scanning apparatus (see, e.g., Japanese Patent Application Laid-open No. 2002-290686) includes a white member and an image scanning unit that uses a CIS for scanning. The white member faces the scanning surface of the image scanning unit. During a period other than the original sheet scanning time when the image scanning unit reads an image from the original, a time period, during which the image scanning unit scans the surface of the white member to create reference white data that is used for shading correction, is provided. There is an interval (gap) between the image scanning unit and the white member so that the original can pass through the interval.

A typical optical system that forms an image at the same magnification has a short optical path and a high concentration of light coming from the light source; therefore, if an original passes in loose contact, a large change occurs in the output level. Here, it is assumed that the amount of change in the output level caused by change in the interval (distance) between the image scanning unit and the original is defined as the depth-of-illumination property.

In an image scanning apparatus having a configuration in which the image scanning unit is fixed and scans an original being conveyed, it is necessary to make a gap that allows an original with a maximum sheet thickness to pass between the image scanning unit and the back. As the maximum sheet thickness increases, it is necessary to increase the gap.

In a typical image scanning apparatus, the white member, which is needed to create the reference white data, always faces the image scanning unit. Alternatively, in some image scanning apparatuses, the white member is configured to move to a position to face the image scanning unit when necessary.

In both cases, due to deviation of movement of the original, the interval between the image scanning unit and the white member and the interval between the image scanning unit and the original cannot always be equal and, in some cases, the intervals are not equal (because, even if the interval between the image scanning unit and the white member is constant, the interval between the image scanning unit and the original may vary). If the intervals are not equal, because of the influence of the depth of illumination, a problem that an undesired line is formed on the image may occur.

Figure 10:
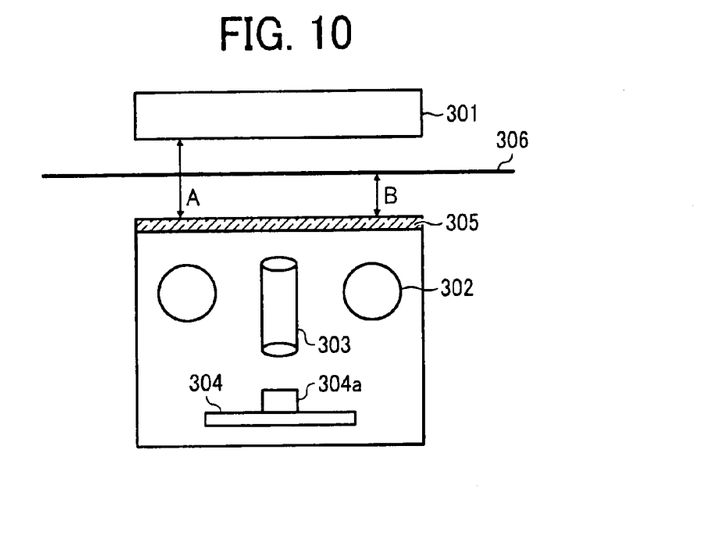
FIG. 10 is a schematic diagram of a conventional image scanning apparatus in which an image scanning unit uses a CIS.
Figure 11:
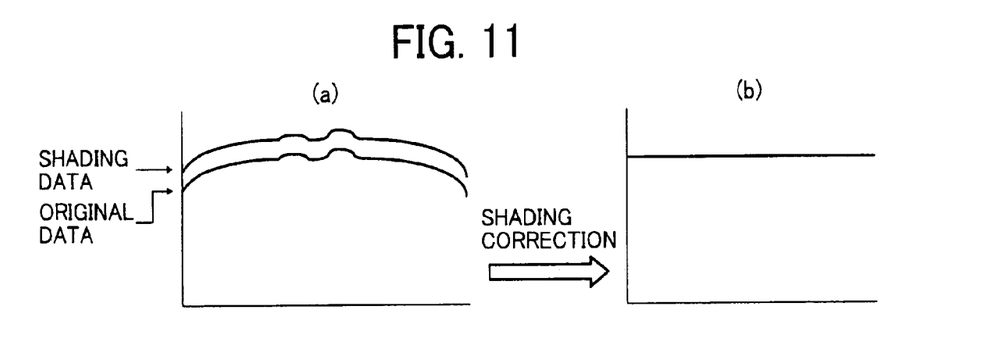
FIG. 11 shows graphs that illustrate a problem that occurs when an image of a white member and an image of an original shown in FIG. 10 are scanned.
Figure 12:
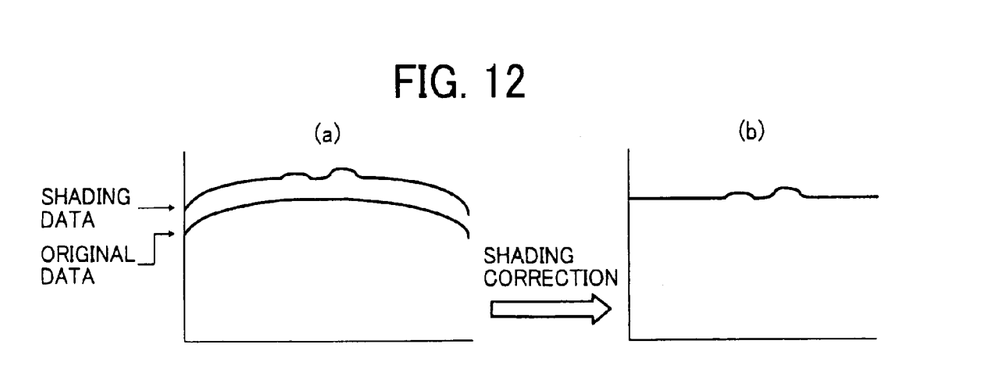
FIG. 12 shows other graphs that illustrate the problem.

With reference to FIGS. 10 to 12, described is the reason why an undesired line is formed on the image because of the influence of the depth of illumination when the white member faces the image scanning unit.

FIG. 10 is a schematic diagram of a conventional image scanning apparatus in which an image scanning unit uses a CIS.

Light emitted from a light source 302 passes through a glass 305 and then illuminates a white member 301 or an original 306. The light reflected or diffused from the white member 301 or the original 306 is received, via a selfoc lens array (SLA) 303, by a sensor IC 304a that is on a sensor board 304. The received light is then converted into electricity and thus an analog image signal is generated.

The interval between the white member 301 to be scanned and the surface of the glass 305 when the white member 301 is scanned is A and the interval between the original 306 and the surface of the glass 305 when the original 306 is scanned is B; therefore, a position of the white member 301 when it is scanned and a position of the original 306 when it is scanned are different in terms of the height above the surface of the glass 305.

Because the scanned image contains unevenness due to the light source and unevenness in the sensitivity of the sensor, a typical image scanning apparatus needs shading correction.

The shading correction is performed using the following equation:

$$Dout=(Din-Bk)/(Dsh-Bk)\times(2^n-1)$$

Dout: output image data after the shading correction
Din: image data obtained when scanning the original
Dsh: image data obtained when scanning the white member (shading data)
Bk: black level (level of image data obtained with no light)

FIGS. 11 and 12 are graphs that illustrate a problem that can occur when an image of the white member 301 and an image of the original 306 shown in FIG. 10 are scanned.

In these graphs, the distribution in the main-scanning direction of image data obtained when the white member 301 is scanned is shown as the shading data, and the distribution in the main-scanning direction of image data obtained when the original 306 is scanned is shown as original sheet data (image data of the original).

When Dout is calculated using the above equation with the shading data being substituted as Dsh and the original sheet data being substituted as Din, as shown in (a) of FIG. 11, if the ratio between the output of Dsh and the output of Din is the same at every pixel position in the main-scanning direction, as shown in (b) of FIG. 11, flat image data is output after the shading correction. In this time, it is assumed that the original scanned in the above example has an even density.

If the depth-of-illumination is uneven along the main-scanning direction, the following problem occurs.

The graph (a) of FIG. 12 illustrates an example where the depth-of-illumination has unevenness near the center in the main-scanning direction. It is clear from the graph that the difference between the scanning level at the interval A and the scanning level at the interval B shown in FIG. 10 is different between at the center section and at the sections other than the center section.

In this case, even when an image on the original having an even density is scanned, as shown in (b) of FIG. 12, the image data output after the shading correction is not flat.

The not-flat part in the image data appears repeatedly in the sub-scanning direction at positions aligned in the sub-scanning direction, and thus an undesired vertical line is formed on the image.

SUMMARY OF THE INVENTION

It is an object of the present invention to at least partially solve the problems in the conventional technology.

According to an aspect of the present invention there is provided an image scanning apparatus including: an image scanning unit that reads an image from an original sheet by scanning an image-formed surface of the original sheet with light in a main-scanning direction and converting light reflected from the image-formed surface into electricity using a photoelectric conversion element, thereby creating an analog image signal; an A/D converting unit that converts the analog image signal that is created by the image scanning unit into a digital image signal and outputs the digital image signal; a shading correction unit that performs shading correction on the digital image signal that has been output from the A/D converting unit; a white member that faces a scanning surface of the image scanning unit; and a reference-white-data creating unit that creates reference white data for the shading correction by scanning a surface of the white member using the image scanning unit. An interval is provided between the image scanning unit and the white member to allow the original sheet to pass through the interval. The image scanning apparatus further includes an interval controlling unit that performs interval control of decreasing the interval between the scanning surface of the image scanning unit and the surface of the white member when the reference-white-data creating unit creates the referential white data. According to another aspect of the present invention there is provided an image scanning method including: conveying an original sheet to pass through an interval between a scanning surface of an image scanning unit and a surface of a white member; reading, using the image scanning unit, an image from the original the by scanning an image-formed surface of the original sheet with light in a main-scanning direction and converting light reflected from the image-formed surface into electricity to create an analog image signal when the original sheet passes through the interval between the scanning surface of the image scanning unit and the surface of the white member; converting the analog image signal into a digital image signal; performing shading correction on the digital image signal; creating reference white data for the shading correction by scanning the surface of the white member using the image scanning unit; and performing interval control of decreasing the interval between the scanning surface of the image scanning unit and the surface of the white member when creating the referential white data.

According to still another aspect of the present invention there is provided an apparatus for scanning an image from an original sheet, including: a means for reading an image from the original sheet by scanning an image-formed surface of the original sheet with light in a main-scanning direction and converting light reflected from the image-formed surface into electricity using a photoelectric conversion element, thereby creating an analog image signal; a means for conveying the original sheet to pass through an interval between a scanning surface of the means for reading and a surface of a white member when the image is read from the original sheet by the means for reading; a means for converting the analog image signal into a digital image signal; a means for performing shading correction on the digital image signal; a means for creating reference white data for the shading correction by scanning the surface of the white member using the means for reading; and a means for decreasing the interval between the scanning surface and the surface of the white member when the means for creating creates the referential white data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. It is assumed in the following embodiments as one possible configuration that an image scanning apparatus has an automatic document feeder (ADF) that feeds an original sheet to be scanned (hereinafter, also referred to as "original sheet", simply) and conveys it to a fixed scanning unit, and an image is read from the original sheet that is being conveyed at a predetermined speed.

Example of Configuration of Image Scanning Apparatus

The configuration of an image scanning apparatus is described with reference to FIG. 1 according to an embodiment of the present invention.

Figure 1:
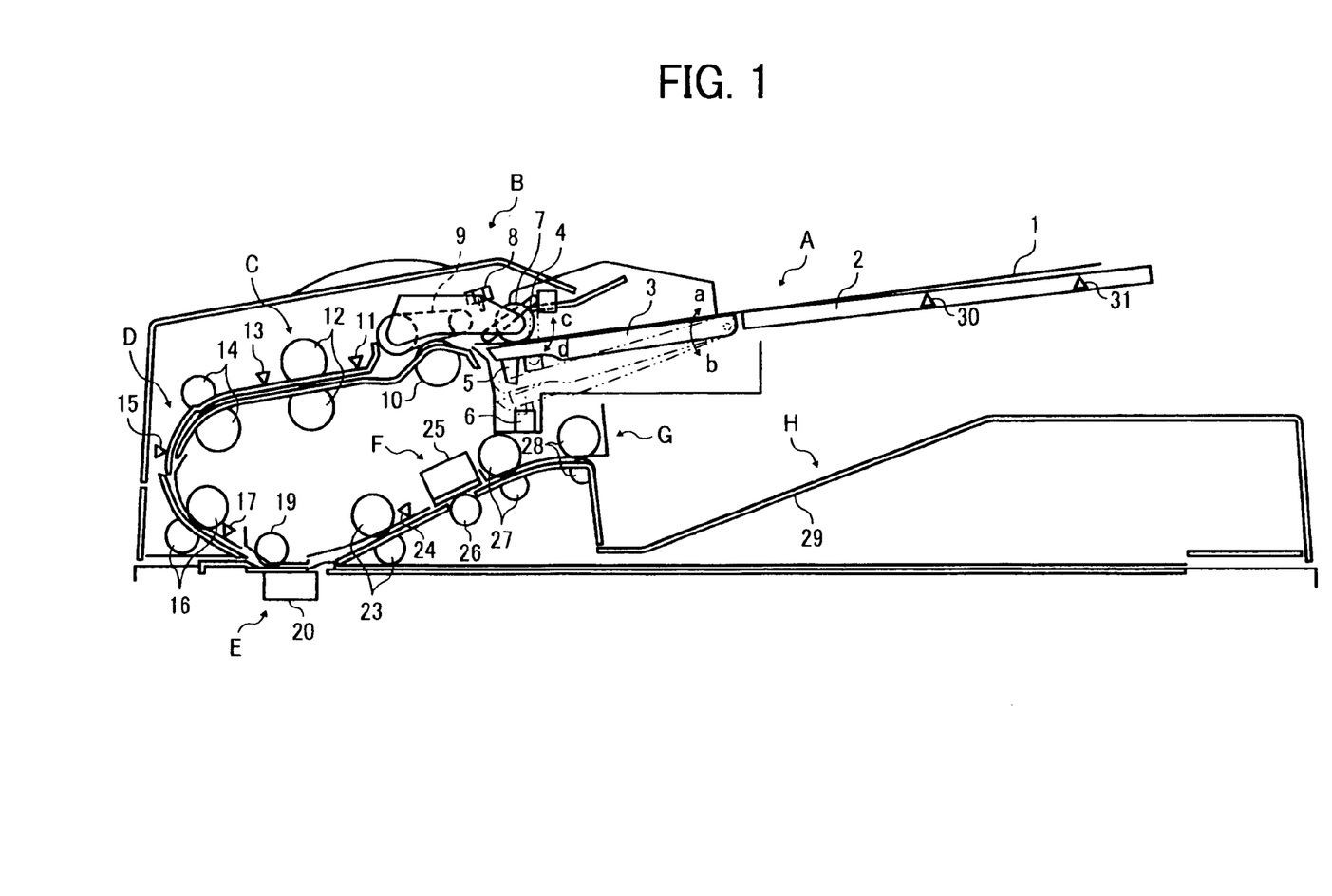
FIG. 1 is a schematic diagram of an example of the configuration of a mechanical system of an image scanning apparatus according to an embodiment of the present invention.

FIG. 1 is a schematic diagram of an example of the configuration of a mechanical system of the image scanning apparatus according to the embodiment of the present invention.

Figure 2:
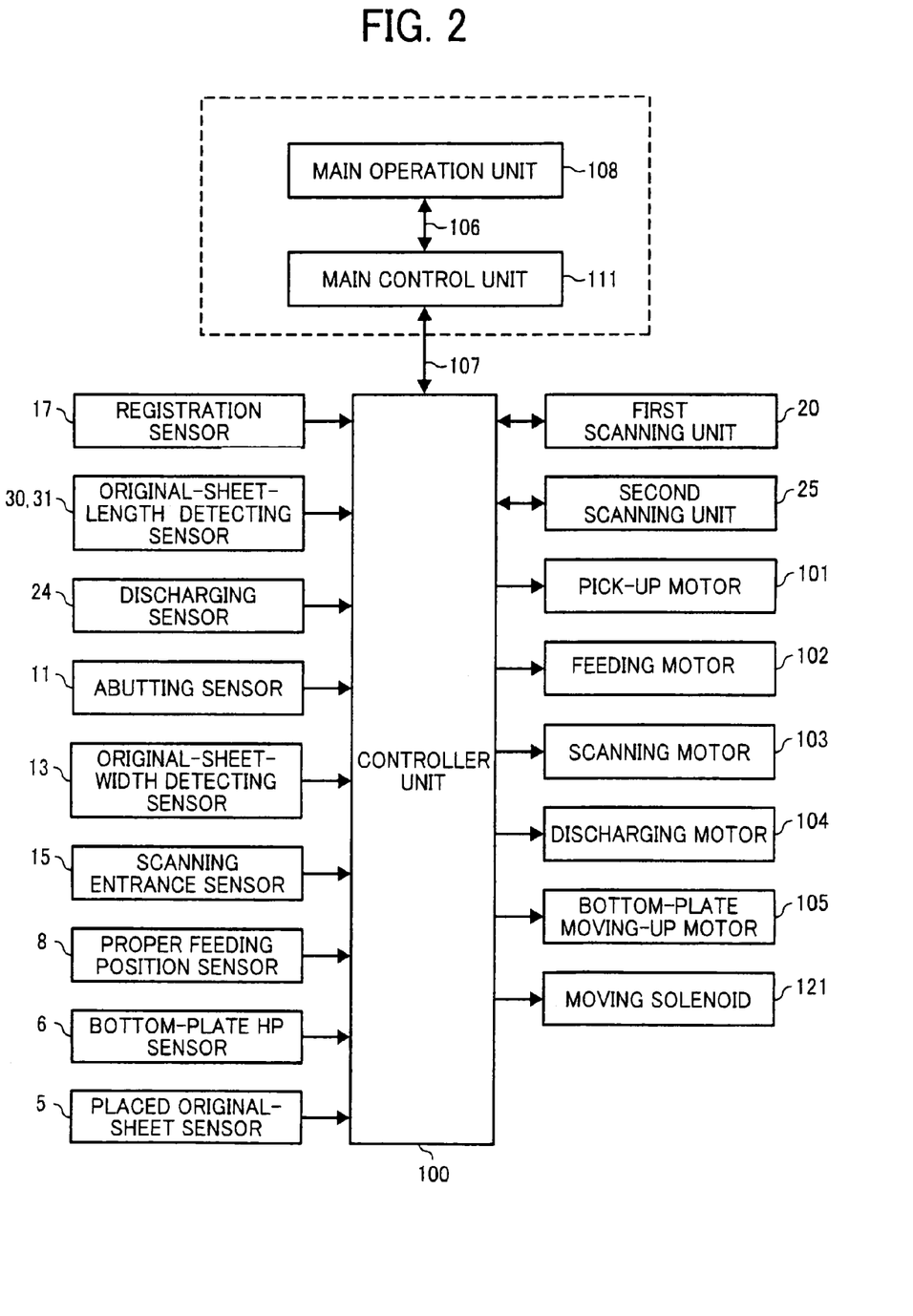
FIG. 2 is a block diagram of an example of the configuration of a control system of the image scanning apparatus.

FIG. 2 is a block diagram of an example of the configuration of a control system of the image scanning apparatus.

The image scanning apparatus includes an original-sheet setting unit A on which a set of original sheets to be fed are placed; a separating/feeding unit B that separates the original sheets one by one and then feeds the individual original sheets; a registration unit C that aligns the fed original sheet by causing the original sheet to abut against therewith during primary alignment and conveys the aligned original sheet; a turn unit D that causes the original sheet to turn and conveys the original sheet in such a manner that a surface of the original sheet to be scanned (if single sided image is formed on the original sheets, the surface to be scanned is the image-formed surface, and, if double sided image is formed on the original sheet, the surface to be scanned is a front surface that is an arbitrary surface) faces toward a scanning unit (faces down); a first scanning/conveying unit E that reads an image from the surface of the original sheet from a lower side of an exposure glass; a second scanning/conveying unit F that reads, after the surface is scanned (if the original sheet is both sided), an image from the back surface of the original sheet; a discharging unit G that discharges, after scanning of the single sided image or the double-sided image is completed, the original sheet out of the image scanning apparatus; a stacking unit H on which the original sheet that has been subjected to the scanning is stacked; driving units 101 to 105 that perform drive to convey the original sheet in the units; and a controller unit 100 that controls a series of processes.

A set of original sheets 1 to be scanned is placed on an original-sheet table 2 of the original-sheet setting unit A that includes a movable original-sheet table 3. A user sets the original sheets 1 with their image-formed surfaces up (if double sided image is formed on the original sheets, with their front surfaces up). Positioning of the original sheets 1 in their width direction (the direction perpendicular to the conveying direction) is preformed by using a side guiding member (not shown). The placed original sheets are detected by a set filler 4 and a placed original-sheet sensor 5 and the detected information is sent from the controller unit 100 to a main control unit 111 via an interface (hereinafter, also referred to as "I/F") 107.

Moreover, using an original-sheet-length detecting sensor 30 or 31 (reflection-type sensor or actuator-type sensor that can detect presence of a sheet even when only one sheet is placed) arranged on the table surface of the original-sheet table 2, the length of the original sheets in the conveying direction is roughly determined. To enable this determination, it is necessary to arrange the sensors in a manner able to determine whether the original sheet is placed in a portrait mode or a landscape mode.

The movable original-sheet table 3 is moved, by a bottom-plate moving-up motor 105, up and down in directions a and b shown in FIG. 1. In a normal state, the movable original-sheet table 3 is at the home position (HP) being detected by a bottom-plate HP sensor 6.

After that, when the set filler 4 and the placed original-sheet sensor 5 detects an original sheet placed, the controller unit 100 receives information indicative of the detection and then causes the bottom-plate moving-up motor 105 to rotate forward so that the movable original-sheet table 3 moves up to a position where the top sheet of the original sheets 1 is in contact with a pick-up roller 7.

The pick-up roller 7 is moved, by a pick-up motor 101 via a cam mechanism, in directions c and d shown in FIG. 1. When the movable original-sheet table 3 moves up, the top surface of the original sheets on the movable original-sheet table 3 pushes the pick-up roller 7 to move it up in the direction c. The upper limit of this upward movement is detectable by a proper feeding position sensor 8.

When a print key on a main operation unit 108 is pressed, the main control unit 111 is informed of that via an I/F 106. When the main control unit 111 sends a document feed signal to the controller unit 100 via the I/F 107, the roller member of the pick-up roller 7 is rotated by forward rotation of a feeding motor 102 and thus one or some original sheets (one is ideal) are picked up from the original-sheet table 2. The rotating direction is the direction to convey (feed) the top original sheet to a feeding port.

A feeding belt 9 is moved, by forward rotation of the feeding motor 102, in the feeding direction. A reverse roller 10 of the separating/feeding unit B is rotated, by forward rotation of the feeding motor 102, in a direction reverse to the feeding direction so that the top original sheet is separated from the subsequent original sheets and thus only the top original sheet can be fed.

More particularly, the reverse roller 10 comes into contact with the feeding belt 9 at a predetermined pressure. When the reverse roller 10 is in direct contact with the feeding belt 9 or in indirect contact with the feeding belt 9 via one original sheet, the reverse roller 10 rotates in the counter-clockwise direction in accordance with the rotation of the feeding belt 9. When two or more original sheets enter accidentally between the feeding belt 9 and the reverse roller 10, because a torque limiter is configured such that the power to rotate the reverse roller 10 in accordance with the rotation of the feeding belt 9 is lower than the torque of the torque limiter, the reverse roller 10 rotates in the clockwise direction, which is its primary driven direction, to convey the extra original sheet back, which prevents conveying original sheets overlapped.

The individual original sheet, which is separated by virtue of the feeding belt 9 and the reverse roller 10, is further conveyed by the feeding belt 9; the leading edge is detected by an abutting sensor 11 of the registration unit C; and the original sheet abuts against a pair of pull-out rollers 12 being in stop.

The original sheet, which abuts against the pull-out rollers 12, is further conveyed by a predetermined amount after it is detected by the abutting sensor 11. As a result, bent portion of the predetermined amount is formed in the original sheet abutting against the pull-out rollers 12, and then the feeding belt 9 stops by stopping the feeding motor and thus a standby state is established.

Then, by rotation of the pick-up motor 101, the pick-up roller 7 moves away from the upper surface of the original sheet and, therefore, the original sheet is conveyed forward only by the power generated by the feeding belt 9. The leading edge of the original sheet then enters a nip between the upper roller and the lower roller of the pull-out rollers 12, and leading-edge alignment (skew correction) is performed.

The pull-out rollers 12 are used to perform the skew correction and convey the separated and skew-corrected original sheet to a pair of intermediate rollers 14. The pull-out rollers 12 are driven by reverse rotation of the feeding motor 102. At this time (when the feeding motor 102 reversely rotates), both the pull-out rollers 12 and the intermediate rollers 14 are driven, while both the pick-up roller 7 and the feeding belt 9 are not driven.

Two or more original-sheet-width sensors 13 are arranged in the depth direction and detect, when the original sheet is conveyed by the pull-out rollers 12 in the conveying direction, the width of the original sheet in the width direction (the main-scanning direction) that is perpendicular to the conveying direction (the sub-scanning direction).

The length of the original sheet in the conveying direction is calculated by detecting the leading edge and the trailing edge of the original sheet by using the abutting sensor 11 and counting pulses output from the feeding motor 102 during a period between when the leading edge is detected and when the trailing edge is detected.

When, by driving the pull-out rollers 12 and the intermediate rollers 14, the original sheet is conveyed from the registration unit C to the turn unit D, the conveying speed in the registration unit C is set to be higher than the conveying speed in the first scanning/conveying unit E in order to shorten the processing time of conveying the original sheet to the first scanning/conveying unit E.

When the leading edge of the original sheet is detected by a scanning entrance sensor 15, before the leading edge of the original sheet enters a nip between an upper roller and a lower roller of a pair of scanning entrance rollers 16, speed decrease starts to decrease the conveying speed of the original sheet do as to be equal to the scanning conveying speed and, at the same time, a scanning motor 103 rotates forward, thereby driving the scanning entrance rollers 16, a first scanning roller 19, a pair of scanning exit rollers 23, a second scanning roller 26, and a pair of CIS exit rollers 27.

When a registration sensor 17 detects the leading edge of the original sheet, the controller unit 100 decreases the conveying speed gradually while conveying the original sheet by a predetermined conveying distance and stops the original sheet at a position before a position to be scanned by a first scanning unit 20 and, at the same time, sends a registration stop signal to the main control unit 111 via the I/F 107.

After that, when the controller unit 100 receives a scanning start signal from the main control unit 111, the original sheet that was stopped in registration process is then conveyed in such a manner that, before the leading edge comes to the position to be scanned by the first scanning unit 20, the conveying speed increases to a predetermined value.

At a timing when the leading edge of the original sheet comes to the position to be scanned by the first scanning unit 20 and which is calculated by counting pulses output from the scanning motor 103, the controller unit 100 sends a gate signal to the main control unit 111 indicative of the effective imaging area of the first surface (front surface) of the original sheet in the sub-scanning direction. The gate signal is sent continuously until the trailing edge of the original sheet exits the position to be scanned by the first scanning unit 20.

When single-sided image on the original sheet is scanned, the original sheet, after being passed through the first scanning/conveying unit E, is conveyed, via a second scanning unit 25 of the second scanning/conveying unit F, to the discharging unit G. When a discharging sensor 24 detects the leading edge of the original sheet, the controller unit 100 rotates a discharging motor 104 forward, thereby rotating a pair of discharging rollers 28. By counting pulses output from the discharging motor 104 since the leading edge of the original sheet is detected by the discharging sensor 24, control is performed in which the driving speed of the discharging motor 104 is decreased, before the trailing edge of the original sheet reaches the nip between the upper roller and the lower roller of the discharging rollers 28, so that, when the original sheet is discharged, the original sheet is prevented from running off and is placed properly on a discharge tray 29 of the stacking unit H.

When both-sided image in the original sheet is scanned, a timing when the leading edge of the original sheet comes to the position to be scanned by the second scanning unit 25 and which is calculated by counting pulses output from the scanning motor 103 since the leading edge of the original sheet is detected by the discharging sensor 24, the controller unit 100 starts sending a gate signal to the main control unit 111 indicative of the effective imaging area of the second surface (back surface) of the original sheet in the sub-scanning direction. The gate signal is sent continuously until the trailing edge of the original sheet exits the position to be scanned by the second scanning unit 25.

The second scanning roller 26 presses the original sheet toward the second scanning unit 25 to prevent the original sheet from being in loose contact with the second scanning unit 25. The second scanning roller 26 also serves as a reference white member with which the second scanning unit 25 acquires shading data (reference white data for shading correction). Therefore, the second scanning roller 26 corresponds to the white member.

The controller unit 100 switches a moving solenoid 121 between ON and OFF at predetermined operational timing, thereby moving the second scanning roller 26 (up or down) and changing the interval between the surface of the second scanning roller 26 and a scanning surface of the second scanning unit 25. Therefore, the controller unit 100 works as an interval controlling unit by switching the moving solenoid 121 between ON and OFF.

Figure 3:
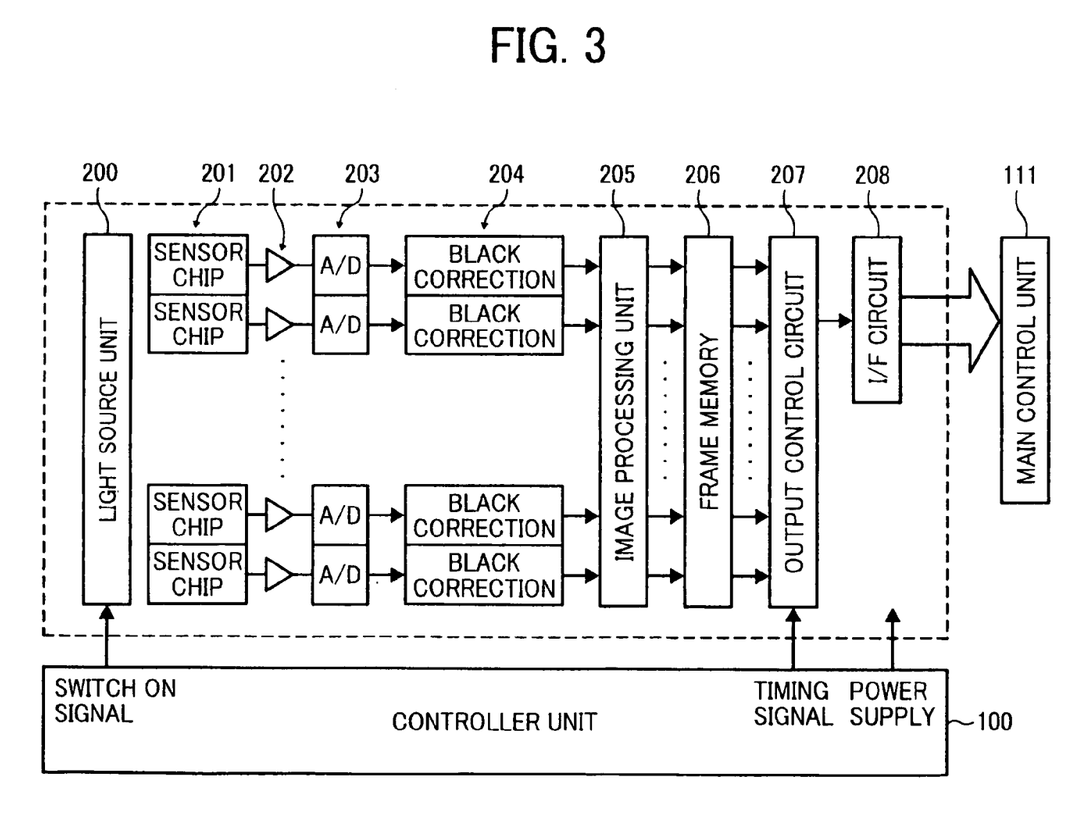
FIG. 3 is a block diagram of an example of the configuration of the relevant parts of the control system of the second scanning unit shown in FIGS. 1 and 2.

FIG. 3 is a block diagram of an example of the configuration of the relevant parts of the control system of the second scanning unit 25 shown in FIGS. 1 and 2. A control system of the first scanning unit 20 has the same configuration; therefore, the same description is not repeated.

The second scanning unit 25 is an image scanning unit that uses a CIS for scanning. The second scanning unit 25 includes an illumination unit or a light source unit 200 that comprises, for example, a light emitting diode array, a fluorescent lamp, or a cold-cathode tube.

The second scanning unit 25 also includes an image scanning unit that comprises a plurality of sensor IC chips (hereinafter, "sensor chips") 201 arranged in the main-scanning direction (the direction that corresponds to the sheet width direction) and a plurality of amplifier circuits 202, and a plurality of A/D converters 203. Each of the amplifier circuits 202 is connected to each of the sensor chips 201. Each of the A/D converters 203 is connected to each of the amplifier circuits 202.

A signal output from each of the A/D converters 203 (digital image signal) contains not only a signal component but also a component of black-level offset. The second scanning unit 25 includes a plurality of black correcting units 204 that removes the component of black-level offset from the signal.

The second scanning unit 25 further includes an image processing unit 205, a frame memory 206, an output control circuit 207, and an I/F circuit 208.

Each of the sensor chips 201 includes a photoelectric conversion element that is called "equal-magnification contact image sensor" and a collecting lens.

Before the original sheet enters the position to be scanned by the second scanning unit 25, the controller unit 100 sends a switch ON signal to the light source unit 200.

In response to the switch ON signal, the light source unit 200 is switched ON and emits light toward the image-formed surface of the original sheet, thereby scanning the image-formed surface with the light in the main-scanning direction (line direction). After that, in each of the sensor chips 201, the light reflected from the image-formed surface of the original sheet is collected by the collecting lens at the photoelectric conversion element, the collected light is converted into electricity line by line, and an analog image signal is thus created.

The analog image signal created by each of the sensor chips 201 is amplified by the corresponding amplifier circuit 202, and the amplified signal is converted to a digital image signal by the corresponding A/D converter 203 (A/D converting unit).

Each of these digital image signals (hereinafter, also referred to as "image data") is subjected to offset correction (black-level correction) by the corresponding black correcting unit 204 to remove its offset component therefrom. The offset-corrected signal is input to the image processing unit 205 and then subjected to the shading correction, etc. The processed signal is then temporarily stored in the frame memory 206.

In the second scanning unit 25, because the image processing unit 205 performs the shading correction, the process of creating the reference white data for the shading correction (shading data) is also performed using the units including the light source unit 200. The units included in the second scanning unit 25 together work as a reference-white-data creating unit; the image processing unit 205 works as a shading correction unit. The process of creating the shading data will be described in details later.

The digital image signal stored in the frame memory 206 is converted by the output control circuit 207 to a format receivable by the main control unit 111. After that, the converted digital image signal is output to the main control unit 111 via the I/F circuit 208.

The controller unit 100 outputs various signals that include a timing signal indicative of a point of time when the leading edge of the original sheet comes to the position to be scanned by the second scanning unit 25 (image data after the point of time is used as effective data), a switch ON signal for the light source, and a power source.

Embodiments of the present invention are described below regarding how the controller unit 100 shown in FIG. 2 controls scanning of the original sheet (reads an image from the original sheet) with reference to FIGS. 4 to 9. In each of the following embodiments, only the scanning of the original sheet using the second scanning unit 25 shown in FIG. 1 is described (that involves moving the second scanning roller 26). Control of scanning of the original sheet using the first scanning unit 20 does not need to move the first scanning roller 19 and is the same as control of the scanning of the original sheet using the second scanning roller 26 with the exception that movement of the second scanning roller 26 is not performed; therefore, the same description is not repeated.

First Embodiment

The scanning of the original sheet under the control of the controller unit 100 shown in FIG. 3 is described below with reference to FIGS. 4 and 5.

Figure 4:
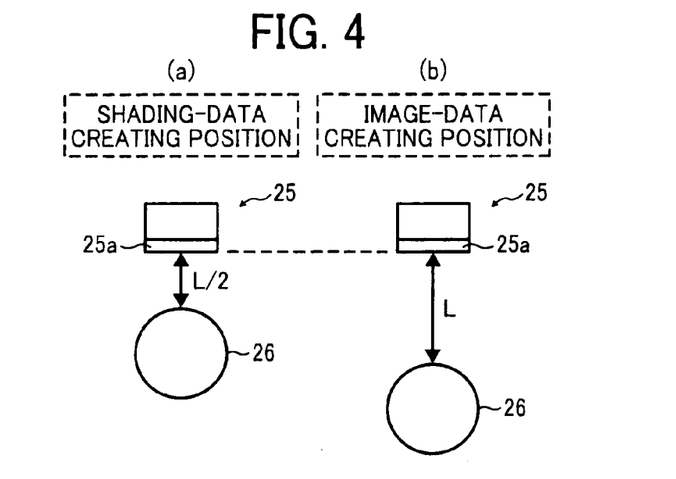
FIG. 4 is a schematic diagram that illustrates the movement of a white member during scanning of the original sheet under the control of the controller unit shown in FIG. 3.

FIG. 4 is a schematic diagram that illustrates the movement of the white member (the second scanning roller 26) during scanning of the original sheet under the control of the controller unit 100 shown in FIG. 3.

Figure 5:
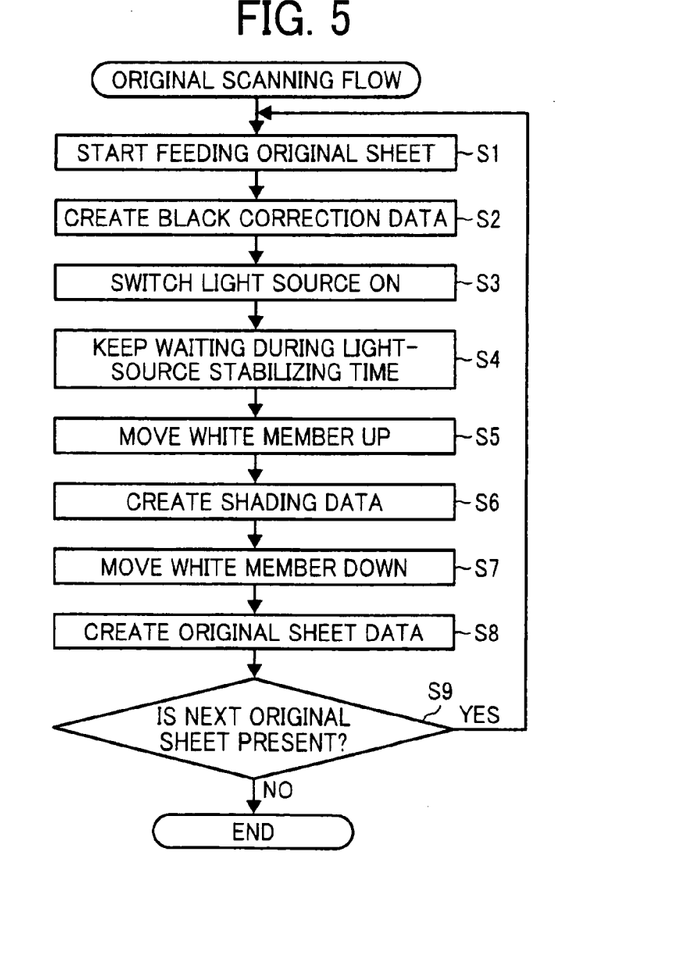
FIG. 5 is a flowchart of a first example of a process for scanning the original sheet under the control of the controller unit shown in FIG. 3.
Figure 6:
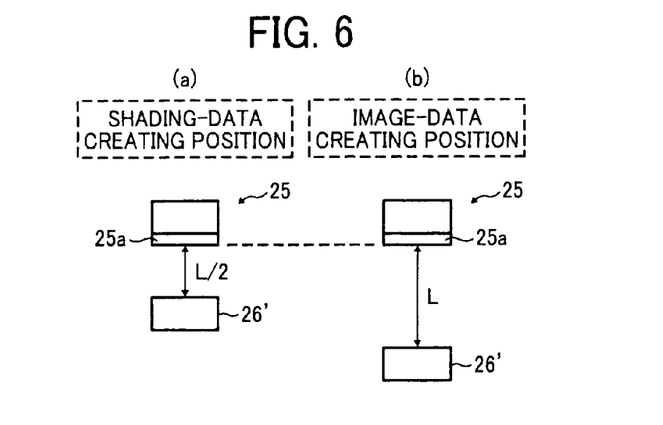
FIG. 6 is a schematic diagram that illustrates the movement of a white member that has a different shape during scanning of the original sheet under the control of the controller unit shown in FIG. 3.

FIG. 5 is a flowchart of a first example of a process of scanning the original sheet under the control of the controller unit 100 shown in FIG. 3.

When the process shown in FIG. 5 starts, the process control goes to Step S1. At Step S1, the controller unit 100 waits for an image-scanning start command coming from the main control unit 111. Upon receiving an image-scanning start command, the controller unit 100 starts feeding (conveying) an original sheet from the original-sheet setting unit A shown in FIG. 1 and sequentially performs the processes from Steps S2 to S7 before the original sheet comes to the position to be scanned.

At Step S2, black correction data is created in a state in which the light source unit 200 of the second scanning unit 25 is switched OFF.

At Step S3, the light source unit 200 is switched ON.

At Step S4, because a certain time is needed until the intensity of light stabilizes after the light source unit 200 is switched ON, the controller unit 100 keeps waiting during a predetermined light-source stabilizing time.

After the predetermined light-source stabilizing time, at Step S5, the second scanning roller 26 (white member) located at a position facing the image scanning section of the second scanning unit 25 is moved up to a shading-data creating position as shown in (a) of FIG. 4. The shading-data creating position is set so that the interval between the second scanning roller 26 and the scanning surface, i.e., a lower surface of a glass 25a of the second scanning unit 25 is half of L, where L is the interval (mm) between the second scanning roller 26 and the lower surface of the glass 25a when the second scanning roller 26 is at a normal position, i.e., an image-data creating position.

At Step S6, by scanning the surface of the second scanning roller 26 using the second scanning unit 25, the shading data is created, and the created shading data is stored in the image processing unit 205.

More particularly, the light source unit 200 is switched ON and emits light toward the surface of the second scanning roller 26, thereby scanning the surface with the light in the main-scanning direction.

After that, in each of the sensor chips 201, the light reflected from the surface of the second scanning roller 26 is collected by the collecting lens at the photoelectric conversion element, the collected light is converted into electricity line by line, and an analog image signal is thus created.

The analog image signal created by each of the sensor chips 201 is amplified by the corresponding amplifier circuit 202, and the amplified signal is converted to a digital image signal by the corresponding A/D converter 203.

Each of theses digital image signals is subjected to offset correction (black-level correction) by the corresponding black correcting unit 204 to remove its offset component therefrom. The offset-corrected signal is input to the image processing unit 205 as shading data and stored in the image processing unit 205.

At Step S7, the second scanning roller 26 located at a position facing the scanning surface of the second scanning unit 25, is moved down (back) to the image-data creating position as shown in (b) of FIG. 4.

After that, the process control goes to Step S8. When the original sheet, which has been fed from the original-sheet setting unit A, comes to the position to be scanned, the second scanning unit 25 scans the original sheet, thereby creating original sheet image data. The image data is subjected to the black-level correction using the black correction data by each of the black correcting units 204 shown in FIG. 3. After that, the black-corrected data is subjected to the shading correction using the shading data by the image processing unit 205.

After the original sheet image data is created, the process control goes to Step S9 and it is checked whether the next original sheet is present on the original-sheet setting unit A. If no next original sheet is present, the process shown in FIG. 5 is completed.

If the next original sheet is present, i.e., continuous scanning of two or more original sheets is to be performed, the process control returns to Step S1 and the controller unit 100 waits for an image-scanning start command to scan the next original sheet. Until it is determined at Step S9 that no next original sheet is present, the processes from Steps S1 to S9 are repeated.

If it is determined at Step S9 that no original sheet to be processed is present, the process shown in FIG. 5 is completed.

If a plurality of original sheets is set on the original-sheet setting unit A and they are fed automatically and sequentially one by one at predetermined intervals in response to just one image-scanning start command, the processes from Steps S2 to S9 are repeated. The interval between sheets means a period other than the original-sheet scanning time during which an original sheet is scanned, i.e., an interval between a first original sheet and a second original sheet subsequent to the first original sheet.

It is noted that the original sheets coming from the original-sheet setting unit A will pass through different levels within the interval L shown in FIG. 4.

If the original sheet is located below the scanning surface (the lower surface of the glass 25*a*) of the second scanning unit 25 by the interval L, because the original sheet is scanned in a state in which there is the interval L that is the same as when the second scanning roller 26 is scanned, the scanning is not affected by the variation in the depth-of-illumination. If the density of the image on the original is constant, the scanned image data is output after the shading correction to be image data having the constant density across the entire main-scanning area.

In general, the influence of the variation in the depth-of-illumination increases, as the variation of the interval between the scanning unit and the scanned target increases.

Therefore, when the original sheet is conveyed along the scanning surface of the second scanning unit 25, the scanning is affected most strongly by the variation in the depth-of-illumination.

To reduce the influence of the variation in the depth-of-illumination, it is necessary to decrease the difference between the interval from the scanning surface of the second scanning unit 25 to the scanned surface of the second scanning roller 26 and the interval from the scanning surface of the second scanning unit 25 to the scanned image (image-formed surface) of the original.

Therefore, during scanning of the surface of the second scanning roller 26 to create the shading data (during scanning of the surface of the second scanning roller 26 as the shading data), the second scanning roller 26 is moved (up) to a position so that the interval from the scanning surface of the second scanning unit 25 decreases to L/2. During scanning of the original sheet, the second scanning roller 26 is moved back (down) to a position so that the interval from the scanning surface of the second scanning unit 25 increases to L. With this configuration, in contrast with a case where the second scanning roller 26 is not moved, the difference between the interval from the second scanning unit 25 to the scanned surface of the second scanning roller 26 and the interval from the second scanning unit 25 to the scanned image on the original is decreased half. This moving operation is also called "interval control".

Suppose a case where the moving operation control is not performed. If the original sheet passes with the interval from the scanning surface of the second scanning unit 25 being from 0 to L (mm), it shows the largest difference from the situation where the surface of the second scanning roller 26 is scanned when the original sheet passes with the interval from the scanning surface of the second scanning unit 25 being 0 (mm). In this case, it is necessary to suppress the variation in the depth-of-illumination property in the range of L (mm) or lower.

Suppose a case where the moving operation is performed. If the original sheet passes with the interval from the scanning surface of the second scanning unit 25 being from 0 to L (mm), it also shows the largest difference from the situation where the surface of the second scanning roller 26 is scanned when the original sheet passes with the interval from the scanning surface of the second scanning unit 25 being 0 (mm). In this case, however, it is enough to suppress the variation in the depth-of-illumination property in the range of L/2 (mm) or lower; therefore, as compared with the case where the moving operation is not performed, of the range where the depth-of-illumination property should be controlled can be decreased to half.

As described above, during scanning of the white member by the image scanning unit (the second scanning unit 25) to create the shading data, the white member (the second scanning roller 26) is moved to a, position so that the interval from the scanning surface of the image scanning unit is set to L/2. During scanning of the original sheet by the image scanning unit, the white member is moved to a position so that the interval from the scanning surface of the image scanning unit is set to L. With this configuration, in contrast with the case where the moving operation is not performed, during scanning of the original image, the difference between the interval from the scanning surface of the image scanning unit to the scanned surface of the white member and the interval from the scanning surface of the image scanning unit to the scanned image on the original can be decreased to half, which reduces the influence of the depth-of-illumination property. Therefore, the shading correction is performed on the image data scanned from the original accurately with suppressing the influence of the depth-of-illumination property, which prevents an undesired vertical line from being formed on the output image.

Moreover, because the second scanning roller 26 is a roller-shaped white member, the rotation of the second scanning roller 26 to convey the original sheet scatters adhered dirt in the rotating direction of the second scanning roller 26, which reduces the influence of the adhered dirt.

Some members other than a roller shaped member can also be used as the white member. It is allowable to use, for example, a rectangular white member 26' shown in FIG. 6.

Because an original sheet passes between the white member and the image scanning unit, if the original sheet is dirty, dirt adheres to the white member.

If a dirty section of the white member is scanned to create the shading data, the output level of the shading data corresponding to the dirty section decreases.

Because this dirty section cannot affect scanning of the original sheet, the output level of the shading-corrected output image data increases at the dirty section of the white member, which prevents appropriate shading correction.

If the white member is a roller shaped member and the roller-shaped white member is configured to rotate when the original sheet is conveyed, adhered dirt will be scattered in the rotating direction of the white member, which reduces the influence of the adhered dirt.

Second Embodiment

The second embodiment is described below. The second embodiment is slightly different from the first embodiment and only the difference is described below.

In the second embodiment, the second scanning roller 26 (white member) is fixed, while the second scanning unit 25 (image scanning unit) is moved (up and down).

More particularly, during scanning of the surface of the second scanning roller 26 to create the shading data, the second scanning unit 25 is moves to such a position that the interval from the surface of the second scanning roller 26 decreases to L/2. During scanning of the original sheet, the second scanning unit 25 is moved to such a position that the interval from the surface of the second scanning roller 26 increases to L.

Therefore, the second embodiment brings the same effects as the effects of the first embodiment.

In any of the third embodiment, the fourth embodiment, and the fifth embodiment, it is allowable to move the second scanning unit 25 in the above manner.

Third Embodiment

The third embodiment is described below with reference to FIGS. 7A and 7B. The third embodiment is slightly different from the first embodiment and only the difference is described below.

Figure 7A:
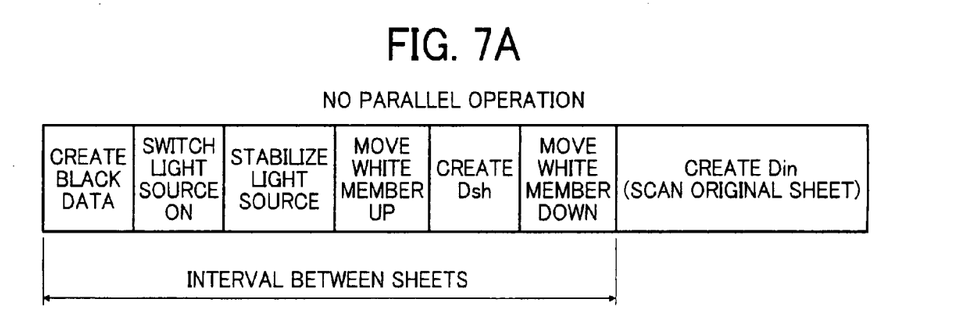
FIGS. 7A and 7B are schematic diagrams that illustrate necessary control processes performed by the controller unit shown in FIG. 3 during an interval between sheets.
Figure 7B:
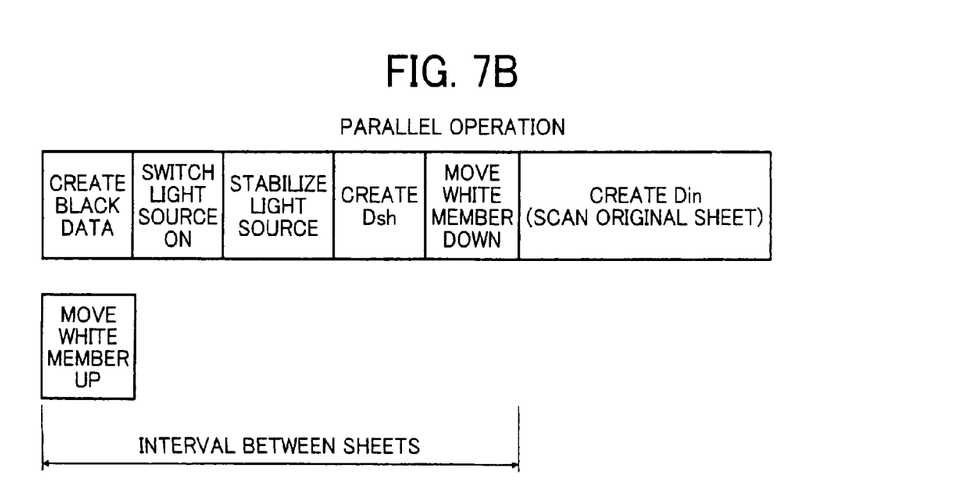

FIGS. 7A and 7B are schematic diagrams that illustrate necessary control processes performed by the controller unit 100 shown in FIG. 3 during an interval between sheets (interval between original sheets).

The movement of the second scanning roller 26 is needed to be completed during a period other than the original-sheet scanning time during when the original sheet is scanned. The period other than the original-sheet scanning time is the intervals between sheets (an original sheet and another original sheet subsequent to the original sheet).

During an interval between sheets, as shown in FIGS. 7A and 7B, the following operation is needed to be completed that involves creating the black correction data, switching the light source unit 200 ON, waiting for stabilizing of the light source to be set stable, moving the second scanning roller 26 (white member) up, creating the shading data (Dsh), and moving the second scanning roller 26 down.

FIG. 7A illustrates an example including no parallel operation; FIG. 7B illustrates an example including parallel operation.

As the interval between sheets increases, the number of scannable original sheets per a unit time decreases (the productivity decreases); therefore, it is preferable to decrease the interval between sheets as much as possible and convey original sheets continuously, thereby increasing the throughput of the scanned original sheets (productivity).

Several hundreds of milliseconds are needed to move up and down the second scanning roller 26; therefore, if this time decreases, the productivity will be improved.

The moving-up of the second scanning roller 26 is needed to be completed before the shading data is created during the original-sheet scanning time, while the operation that involves creating the black correction data, switching the light source unit 200 ON, and waiting for stabilizing of the light source are not affected by the movement of the second scanning roller 26 and the position of the second scanning roller 26; therefore, if parallel operation is included, as shown in FIG. 7B, the operation that involves creating the black correction data, etc., is performed in parallel with moving (up) of the second scanning roller 26 (white member).

With this configuration, the interval between sheets can be set without taking into consideration the time to move up the second scanning roller 26, which improves the productivity.

Fourth Embodiment

The fourth embodiment is described below with reference to FIG. 8. The fourth embodiment is slightly different from the first embodiment or the third embodiment and only the difference is described below.

Figure 8:
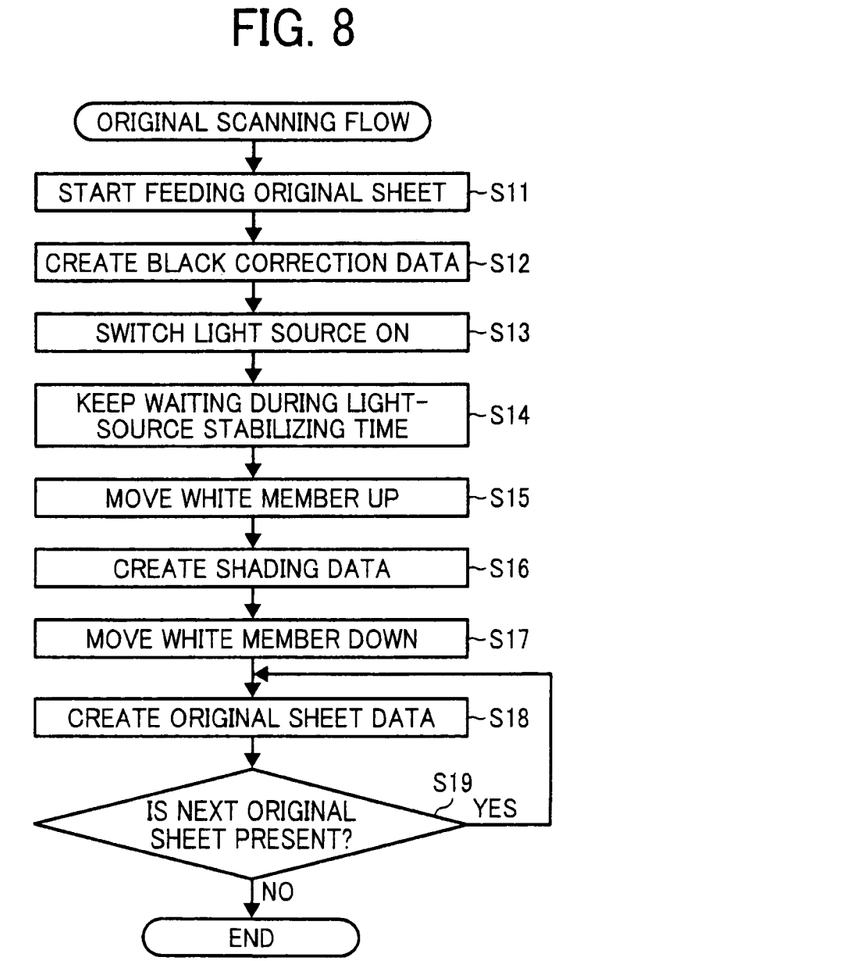
FIG. 8 is a flowchart of a second example of the process of scanning the original sheet under the control of the controller unit shown in FIG. 3.

FIG. 8 is a flowchart of a second example of the process of scanning the original sheet under the control of the controller unit 100 shown in FIG. 3. It is assumed that two or more original sheets set on the original-sheet setting unit A are fed automatically and sequentially one by one at predetermined intervals in response to just one image-scanning start command.

The controller unit 100 performs, in Steps S11 to S19 of FIG. 8, the same processes as the processes of Steps S1 to S9 of FIG. 5. If it is determined at Step S19 that the next original sheet is present, the process control returns to Step S18 and, when the next original sheet, which has automatically been fed from the original-sheet setting unit A, comes to the position to be scanned, the next original sheet is scanned by the second scanning unit 25 and thus image data of the next original sheet is created. It means that the sheet-interval processes of Steps S11 to S17 are performed only at the beginning of each job (only when an image is read from the first original sheet) and they are not performed when an image is read from any of the subsequent original sheets.

As described above, the shading data is created only at the beginning of each job, and thus it is possible to decrease the interval between sheets, which further improves the productivity.

It is necessary to set the timing (interval) to create the shading data so as to absorb a deviation in the shading data. Although, in the fourth embodiment, the timing is set to the beginning of each job, the timing can be set to some other. In the following fifth embodiment, the shading data is created at another timing.

Fifth Embodiment

The fifth embodiment is described below with reference to FIG. 9. The fifth embodiment is slightly different from the first embodiment or the third embodiment and only the difference is described below.

Figure 9:
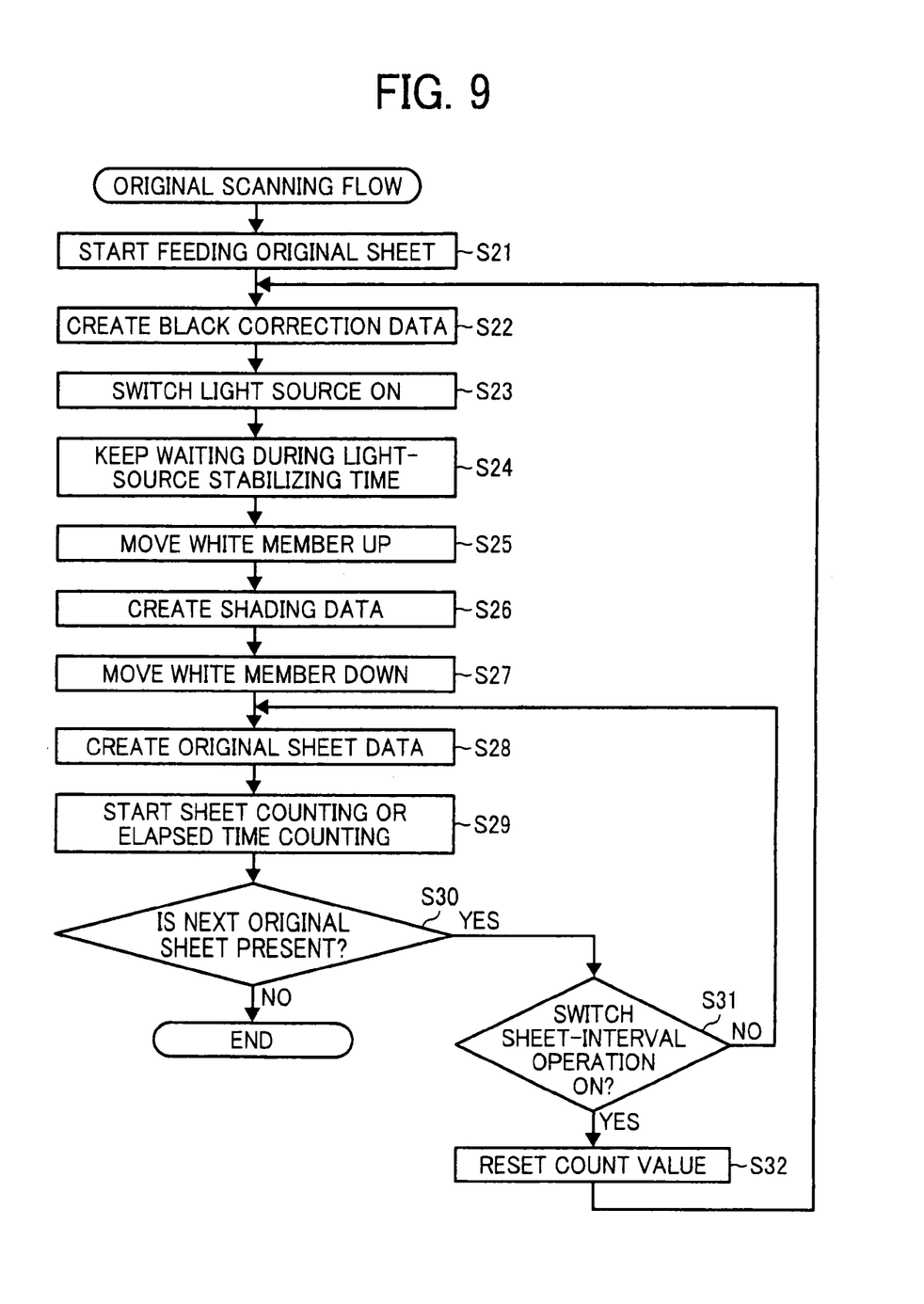
FIG. 9 is a flowchart of a third example of the process of scanning the original sheet under the control of the controller unit shown in FIG. 3.

FIG. 9 is a flowchart of a third example of the process for scanning the original sheet under the control of the controller unit 100 shown in FIG. 3. It is assumed that two or more original sheets that are set on the original-sheet setting unit A are fed automatically and sequentially one by one at predetermined intervals in response to just one image-scanning start command.

The controller unit 100 performs, in Steps S21 to S28 of FIG. 9, the same processes as the processes of Steps S1 to S8 of FIG. 5.

When scanning of one original sheet is completed at Step S28, the process control goes to Step S29 and original-sheet counting or elapsed time counting (calculating) is performed.

The process control then goes to Step S30 and it is checked whether the next original sheet is present on the original-sheet setting unit A. If the next original sheet is present, the process control goes to Step S31.

At Step S31, it is determined in accordance with the count value obtained at Step S29 (the total number of the original sheets or the total elapsed time) whether the sheet-interval operation is to be performed for the next original sheet (the sheet-interval operation is set to ON) or not (the sheet-interval operation is set to OFF). For example, if the total number of the original sheets is smaller than 50, it is determined that the sheet-interval operation is not to be performed for the next original sheet. If the total number of the original sheets is 50, it is determined that the sheet-interval operation is to be performed for the next original sheet.

If the sheet-interval operation is not to be performed, the process control returns to Step S28 and, when the next original sheet, which has been fed from the original-sheet setting unit A, comes to the position to be scanned, the next original sheet is scanned by the second scanning unit 25 and thus image data of the next original sheet is created. After that, the process control goes to Step S29.

If the sheet-interval operation is to be performed, the count value is reset to 0 at Step S32. After that, the process control returns to Step S22 and the sheet-interval operation is performed at Step S22 and the subsequent steps.

As described above, the shading data is created every time after a predetermined number of original sheets was scanned or a predetermined time elapsed, which brings the same effects as the effects of the fourth embodiment.

Although, in the first, the second, the third, the fourth, and the fifth embodiments, when the shading data is created, the second scanning roller 26 is moved to such a position that the interval from the scanning surface of the second scanning unit 25 decreases to L/2 or the second scanning unit 25 is moved to such a position that the interval from the surface of the second scanning roller 26 decreases to L/2, the interval can be set to any value lower than L, for example, L/3.

Because an image forming apparatus that includes the image scanning apparatus according to the present invention forms an image in accordance with a highly accurately shading-corrected digital image signal, a high quality image is formed. Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image scanning apparatus comprising:
   an image scanner configured to read an image from an original sheet by scanning an image-formed surface of the original sheet with light in a main-scanning direction and convert light reflected from the image-formed surface into electricity using a photoelectric conversion element, thereby creating an analog image signal;
   an A/D converter configured to convert the analog image signal that is created by the image scanner into a digital image signal and output the digital image signal;
   a shading corrector configured to perform shading correction on the digital image signal that has been output from the A/D converter;
   a white member that faces a scanning surface of the image scanner; and
   a reference-white-data creator configured to create reference white data for the shading correction by scanning a surface of the white member using the image scanner, wherein an interval is provided between the image scanner and the white member to allow the original sheet to pass through the interval, and the image scanning apparatus further comprises
   an interval controller configured to perform interval control of decreasing the interval between the scanning surface of the image scanner and the surface of the white member when the reference-white-data creator creates the referential white data.

2. The image scanning apparatus according to claim 1, wherein the interval controller is configured to move the white member to such a position that the interval between the white member and the scanning surface of the image scanner decreases.

3. The image scanning apparatus according to claim 1, wherein the interval controller is configured to move the image scanner to such a position that the interval between the image scanner and the surface of the white member decreases.

4. The image scanning apparatus according to claim 1, wherein the white member is a roller shaped member.

5. The image scanning apparatus according to claim 1, wherein the interval controller is configured to perform the interval control in parallel with performing another control process.

6. The image scanning apparatus according to claim 1, wherein the reference-white-data creator is configured to create the reference white data only once at the beginning of each job.

7. The image scanning apparatus according to claim 1, wherein the reference-white-data creator is configured to create the reference white data after a predetermined number of original sheets was scanned or a predetermined time elapsed.

8. An image forming apparatus comprising the image scanning apparatus according to claim 1, wherein the image forming apparatus forms an image in accordance with the digital image signal output from the image scanning apparatus.

9. An image scanning method comprising:
   conveying an original sheet to pass through an interval between a scanning surface of an image scanner and a surface of a white member;
   reading, using the image scanner, an image from the original sheet by scanning an image-formed surface of the original sheet with light in a main-scanning direction;
   converting light reflected from the image-formed surface into electricity to create an analog image signal when the original sheet passes through the interval between the scanning surface of the image scanner and the surface of the white member;
   converting the analog image signal into a digital image signal;
   performing shading correction on the digital image signal;
   creating reference white data for the shading correction by scanning the surface of the white member using the image scanner; and
   performing interval control of decreasing the interval between the scanning surface of the image scanner and the surface of the white member when creating the referential white data.

10. The image scanning method according to claim 9, wherein the interval control is performed by moving the white member to such a position that the interval between the white member and the scanning surface of the image scanner decreases.

11. The image scanning method according to claim 9, wherein the interval control is performed by moving the image scanner to such a position that the interval between the image scanning unit and the surface of the white member decreases.

12. The image scanning method according to claim 9, further comprising:
rotating a roller shaped member used as the white member when the original sheet passes through the interval between the scanning surface of the image scanner and the white member.

13. The image scanning method according to according to claim 9, wherein the interval control is performed in parallel with performing another control process.

14. The image scanning method according to according to claim 9, wherein creating the reference white data is performed only once at the beginning of each job.

15. The image scanning method according to according to claim 9, wherein creating the reference white data is performed after a predetermined number of original sheets was scanned or a predetermined time elapsed.

16. An apparatus for scanning an image from an original sheet, comprising:

a means for reading an image from the original sheet by scanning an image-formed surface of the original sheet with light in a main-scanning direction and converting light reflected from the image-formed surface into electricity using a photoelectric conversion element, thereby creating an analog image signal;

a means for conveying the original sheet to pass through an interval between a scanning surface of the means for reading and a surface of a white member when the image is read from the original sheet by the means for reading;

a means for converting the analog image signal into a digital image signal;

a means for performing shading correction on the digital image signal;

a means for creating reference white data for the shading correction by scanning the surface of the white member using the means for reading; and a means for decreasing the interval between the scanning surface and the surface of the white member when the means for creating creates the referential white data.

* * * * *